(12) United States Patent
Rolih

(10) Patent No.: US 10,659,508 B2
(45) Date of Patent: *May 19, 2020

(54) SEE, DO, REVIEW, FULL-CYCLE INSTRUCTION PERFORMANCE ANALYSIS PROCESS AND SYSTEM

(71) Applicant: Michael J. Rolih, Rochester, MN (US)

(72) Inventor: Michael J. Rolih, Rochester, MN (US)

(73) Assignee: REPETIX, LLC, Rochester, MN (US)

( * ) Notice: Subject to any disclaimer, the term of this patent is extended or adjusted under 35 U.S.C. 154(b) by 298 days.

This patent is subject to a terminal disclaimer.

(21) Appl. No.: 15/353,460

(22) Filed: Nov. 16, 2016

(65) Prior Publication Data

US 2017/0063957 A1    Mar. 2, 2017

Related U.S. Application Data

(63) Continuation-in-part of application No. 14/460,102, filed on Aug. 14, 2014, now Pat. No. 9,934,699.

(51) Int. Cl.
| | | |
|---|---|---|
| G09B 19/00 | (2006.01) | |
| H04L 29/06 | (2006.01) | |
| H04B 1/3827 | (2015.01) | |
| H04L 12/26 | (2006.01) | |

(52) U.S. Cl.
CPC ........ *H04L 65/601* (2013.01); *G09B 19/0038* (2013.01); *H04B 1/385* (2013.01); *H04L 43/106* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 2005/0151852 A1* | 7/2005 | Jomppanen | H04N 5/0733 348/218.1 |
| 2007/0143382 A1* | 6/2007 | Luster | A63B 24/0021 708/100 |
| 2012/0258433 A1* | 10/2012 | Hope | G06F 19/3481 434/247 |
| 2014/0189937 A1* | 7/2014 | Pietrzak | A42B 3/042 2/411 |

* cited by examiner

*Primary Examiner* — Bruk A Gebremichael
(74) *Attorney, Agent, or Firm* — Vitale, Vickrey, Niro & Gasey

(57) ABSTRACT

A computer implemented education and playbook system, method, and apparatus for providing an interactive, recursive and in situ coaching system. A coach can use a portable electronic device to transmit play information to a number of players via wearable electronic devices, including the claimed helmet apparatus, the play then being filmed and time stamped for subsequent review and storage in a coach's practice plan.

10 Claims, 4 Drawing Sheets

SEE, DO, REVIEW, FULL-CYCLE INSTRUCTION PERFORMANCE ANALYSIS PROCESS AND SYSTEM

PRIORITY OF INVENTION

This application is a Continuation in Part and claims priority of non-provisional application Ser. No. 14/460,102 filed Aug. 14, 2014.

FIELD OF THE INVENTION

The present invention relates generally to a computer implemented education and playbook system, method, and apparatus for providing an interactive, recursive and in situ coaching system, and more specifically to providing and implementing a system whereby a coach can use a portable electronic device to transmit play information to a number of players via wearable electronic devices, the play then being filmed and time stamped for subsequent review and storage in a coach's practice plan and playbook.

BACKGROUND OF THE INVENTION

Team sports invariably involve a series of practices incorporating a recursive, repetitive learning process in order to maximize performance. As part of this process, coaches can keep copies of plays in notebooks, on laptop computers, handheld computing devices and elsewhere. During a practice, a coach may have no direct access to recorded plays and no way to record new plays or integrate or review the performance of existing plays.

In some sports like football, a one-way radio is commonly used between a coach and a player, where the player is equipped with a radio receiver and earphone or speaker in a helmet. The coach can verbally relay plays or ideas to the player. U.S. Pat. No. 8,608,478 (Luster) further teaches a coach's electronic clipboard with an optional associated remote personal unit worn by a player, such as a wrist or other unit with a small display worn by a player. Optionally, Luster teaches that real-time game photographs can be displayed on the coach's electronic clipboard.

The state of the prior art, however, fails to provide an automated way to improve efficiency of practice time, especially at the college and high school levels. There exists a pronounced need to avoid lost time during practice due to negative repetitions (i.e., repetitions that occur with significant mistakes, thus necessitating further repetition of the same play). Such negative repetitions occur due to (among other reasons) ineffective communications between players and coaches or lack of knowledge. Such problems are more pronounced for teams operating under institutional practice time restrictions. For instance, the NCAA imposes a 20-hour work rule, where mandatory player/coach interaction is restricted to a maximum of 20-hours per week. Any effective loss of time during practice, such as occurs with negative repetitions, can result in significant competitive disadvantages during game day.

Thus, there is a need for a system, method, and apparatus where a player can see a play effectively displayed prior to physical execution in order to provide each player with a brief reminder of specific play responsibility. Further, there is a need to automatically capture and store the physical execution of the play to enable the prompt review by the players with immediate feedback and additional communication by the coaches as desired.

Definition of Terms

The following terms are used in the claims of the patent as filed and are intended to have their broadest plain and ordinary meaning consistent with the requirements of the law:

A "coaching computer module" is a software package accessed via a tablet, PDA, or other handheld mobile device which enables a coach to provide input by voice, text, typing, mouse, stylus, voice or other similar means.

A "playbook" is a compendium of plays to be studied and practiced, which are stored in a Memory, such as in a server or accessible by a server, for access by a coaching computer module and practice module.

A "practice module" is a software module which can be accessed via a coaching computer module or a server or the like which receives and stores plays from the playbook and related input selected by a coach to be practiced, and optionally receives and stores time stamped and cut plays which have been called by the coaching computer module and filmed.

"Wearable computer devices" are portable hardware assemblies containing electronic display capabilities, which may be worn around the forearm, affixed to a helmet apparatus, or similarly attached to a user during a practice.

A "playbook generation module" is a software interface for a coach to generate plays.

A "software application trigger" is a software tool for selecting a camera in response to a signal via a coaching computer module for recording a play being practiced.

An "authentication module" is a software security package for preventing unauthorized users from accessing the claimed system.

An "enclosed embedded mount" is a hardware assembly which affixes the wearable computer device to the interior of the helmet apparatus.

An "adjustable optical piece" is a display piece connected to the wearable computer device on which inputs from the coaching computer module are displayed.

A "portable electronic display receiver" means a wearable computer device.

Where alternative meanings are possible, the broadest meaning is intended. All words used in the claims set forth below are intended for use in the normal, customary usage of grammar and the English language.

SUMMARY OF THE INVENTION

The present invention relates to one or more of the following features, elements or combinations thereof.

The present invention encompasses a system, method, and apparatus for interactively and recursively coaching a practice in situ. It produces a superior coaching efficiency compared to current practice plans, because it is believed to reduce inefficient use of practice time by 20-30% or more.

One disclosed embodiment is directed to a system providing an interactive, recursive and in situ coaching system including a coaching computer module, which allows a coach to select and generate signals to a plurality of players corresponding to plays from a playbook, a plurality of wearable computer devices for the plurality of players to receive signals from the electronic coaching module, the wearable computer devices including an electronic display for displaying plays and accessing information linked to plays. The system of this embodiment further includes a playbook generation module wherein a user can create or develop plays to be sent via the coaching computer module to the wearable computer devices. The system also includes a practice module, electronically linked to the playbook, for obtaining information that is entered by a user from the playbook that can be used during a practice period.

In addition, the system includes a server for receiving and sending signals between the coaching computer module and the plurality of wearable computer devices, and a software application trigger accessible through the server that selects at least one camera for recording the performance of plays selected by the coaching computer module wherein the selection of a given play by the coaching computer module causes the conclusion filming of the prior play, with the resulting time stamped play recording being accessible for review by the wearable computer devices and/or the coaching computer module, and such time stamped play recording being capable of recorded in the practice module for further review. The server of the system may be located on-field, off-site, cloud-based, or a combination thereof. The server communications may occur over such technologies as Wi-Fi, spectrum wireless networks, Bluetooth, or by other similar means or combinations thereof.

Additionally, the helmet apparatus comprises a wearable computer device that is affixed to the interior of a helmet casing by an enclosed embedded mount. Inputs from the coaching computer module are displayed to the plurality of players on the adjustable optical piece that is attached to the wearable computer device.

Another embodiment of the present invention may also include an authentication module to prevent the unauthorized access of the practice plan or playbook.

Thus, it can be seen that one object of the disclosed invention is to provide system for an interactive, recursive in situ coaching system.

A further object of the present invention is to reduce or eliminate negative repetitions during sporting practices.

Another embodiment of the present invention is to permit the recording of video from the first-person perspective of a player for review by a coach, other players, or third parties.

Another object of the invention is to provide for the automatic recording and immediate review of plays selected by a coach to be practiced.

Still another object of the present invention is to provide for a method whereby a player can review a play to be practices immediately prior to be executed, and may further review the results of such a practiced play immediately after execution.

It should be noted that not every embodiment of the claimed invention will accomplish each of the objects of the invention set forth above. For instance, certain claimed embodiments of the invention will not require authentication module. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of an example embodiment thereof, and as illustrated in the accompanying drawings.

DETAILED DESCRIPTION OF EMBODIMENTS OF THE INVENTION

Figure 1:
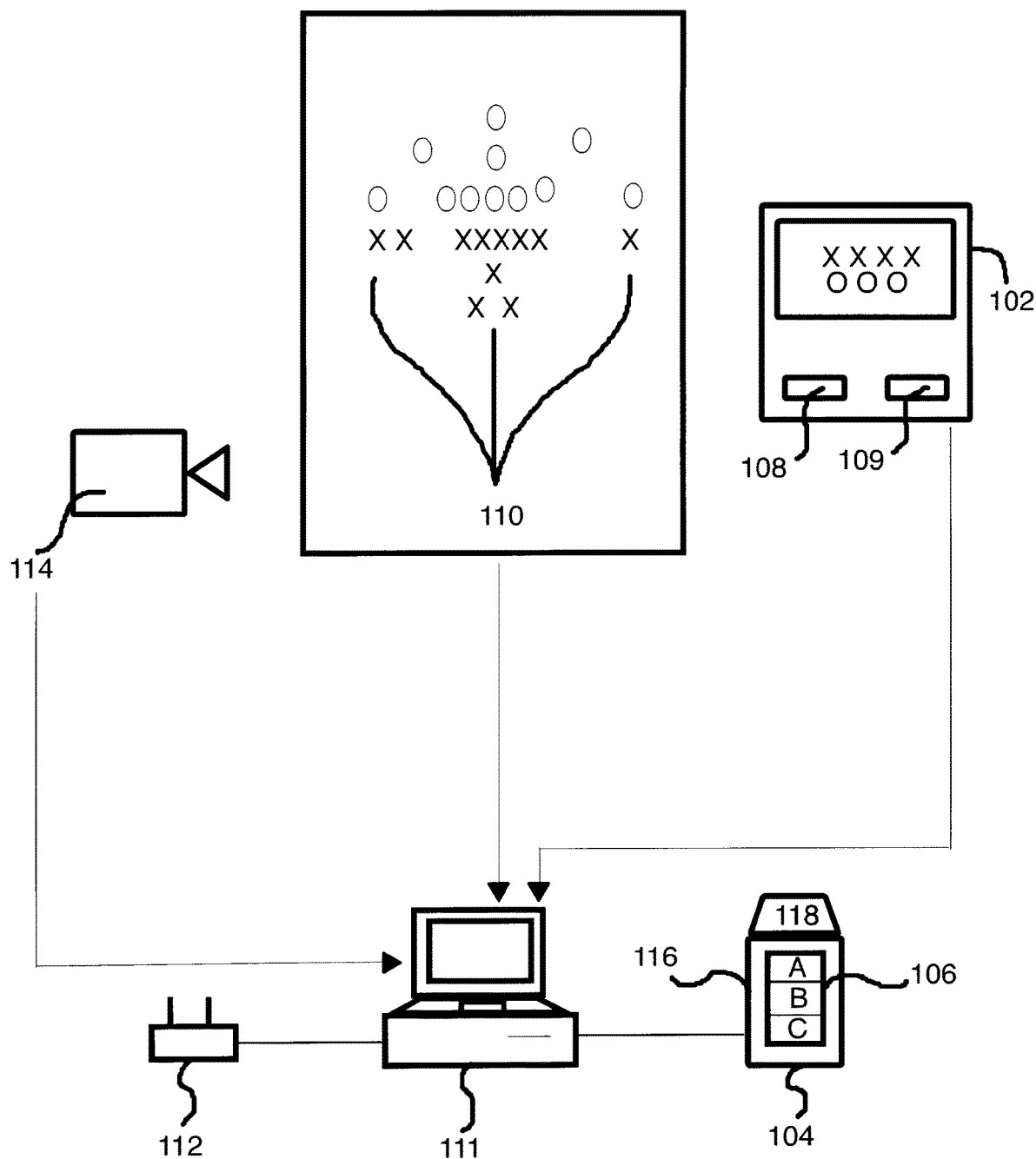
FIG. 1 is a schematic of a first preferred embodiment of the interactive, recursive and in situ coaching system of the present invention.

As can be seen in FIG. 1, the system 100 includes a coach's portable electronic device 102, such as a cell phone, tablet, or laptop. The coach's portable electronic device 102 accesses a memory 104 which may be stored locally and/or accessed via a remote server 111, the memory 104 having an electronic playbook application 106 stored thereon. The electronic playbook application 106 preferably includes multiple animated plays which may optionally be linked or segregated with associated notes from the coach and/or segments of the play being executed as described herein below. The electronic playbook application 106 further includes the ability to add further plays and/or modify existing plays according to the coach user's preferences.

The electronic playbook application 106 is a software application most preferably includes a coaching computer module 106a which is accessed by the coach's portable electronic device 102 so as to enable the coach to provide various inputs, including the transfer button and the review prompt as described below. The electronic playbook application further preferably includes a practice module 106b which may be integrated with or accessed by the coaching computer module so as to receive and store plays and related input selected by a coach to be practiced, and further may receive and store time stamped and cut plays which have been called by the coaching computer module 106a and stored. In addition, the electronic playbook application 106 further includes a playbook generation module 106c which provides a software interface for a coach to generate plays, either on the coach's portable electronic device 102 or separately, away from practice on any computer device (not shown) which can access the coaching computer module 106a.

The coach's portable electronic device 102 will enable a coach to transmit a selected, single animated playbook play from available plays within the electronic playbook application 106 by touching a transfer button 108 (or using a similar activation command or other button) which will cause the electronic playbook application 106 to transfer the selected animated playbook play to all individual players and coaches who are wearing a portable electronic display receiver 110 (e.g., the helmet wearable computer device, a wearable 3.5" display screen, or similar receiver) that is registered or otherwise linked to the electronic playbook application 106, preferably through server 111 and/or router 112.

By pressing the transfer button 108, the electronic playbook application 106 further causes a series of local video actions with one or more video cameras 114 that are videotaping the practice for feedback to the coaches and players. Specifically, by pressing the transfer button 108, the electronic playbook application 106 issues a command to each video camera 114 to time-stamp, cut and transfer the prior videotaped segment (corresponding to the prior play) into the memory 104 to a coaches practice module 106b associated with the electronic playbook application 106, with that play being stored in memory 104 and linked with its associated play within the electronic playbook application 106. Preferably, the system 100 provides a separate segment corresponding to each camera or other video corresponding to a given play, with each segments resulting in a separate "thumbnail" view that the coach's portable electronic device 102 can access.

As the same time that the signal provided by the transfer button 108 is causing the time-stamp, cut and transfer of the prior videotaped segment, that action similarly causes the video camera(s) 114 to begin recording the execution of the next play. Most preferably, this occurs through the use of a software application trigger 116 which activates the desired video recorder(s) in response to the coach's input from the transfer button. That is, in its most preferred form, the system only requires a single press of the transfer button 108 executed by the coach's portable electronic device 102 to time stamp and batch the video of the prior play, and to begin video of the current play.

As the electronic playbook application 106 transfers the selected animated playbook play to all individual players and coaches who are wearing a portable electronic display receiver 110, each player and coach can watch the transferred animated play execute on the respective display screens of their respective portable electronic display receivers 110 and further can identify specific coaching information about the individual play, such as the play name, personnel groupings, coaching sideline signals relevant to their position, and their respective responsibilities within the play.

Upon execution of the selected play, the system further provides for a coach's portable electronic device 102 to include a review prompt 109 (such as a button or other prompt) which enables the coach to transfer video from a clip of the previous play to all portable electronic display receivers 110 for review and to provide immediate feedback about the performance of the executed play, including areas of improvement and additional coaching tips.

In order to prevent the unauthorized access to this system 100, the system further includes an authentication module 118 which is a software security package for presented unauthorized users from accessing the contents of the system. This authentication module 118 is most preferably a separate module from the modules of the electronic playbook application 106, though like the electronic playbook application 106 modules, the authentication module 118 preferably resides on the memory 104 at the server 111 so as to make such that any communications with a coach's portable electronic device 102 or a portable electronic display receiver 110 is, in fact, authorized. The authentication module can be controlled by voice recognition technology, requiring the player or coach user to speak before being permitted to access the contents of the system.

Figure 2:
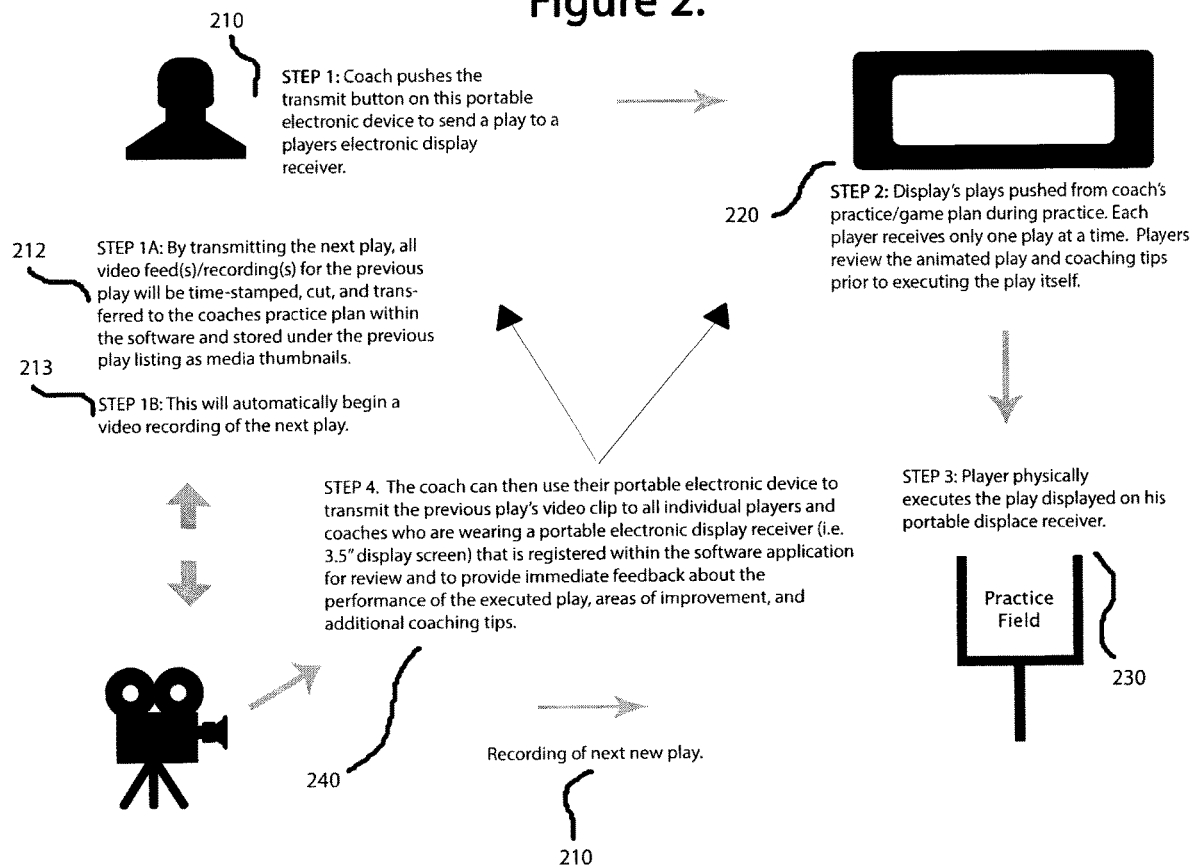
FIG. 2 is a process flow diagram of a preferred embodiment of the interactive, recursive and in situ coaching system of the present invention.

As shown in FIG. 2, the process 200 corresponding to the use of the present invention may be diagrammed schematically as a recursive loop. In the first step 210, the coach pushes a transmit button or similar activation device to send a next play to one or more player wearable electronic display receiver. By transmitting the next play, that step simultaneously causes 212 the automatically time stamping, cutting and transfer of the video feed(s) from the prior play in the coaches practice plan within the electronic playbook application. A third simultaneous step 213 is that the transmission of the next play automatically causes the video recorder(s) to begin recording the next play. Then, for the next step 220, the animation for the next play is then displayed to each player and coach on their respective wearable displays, as well as any coaching tips entered by the coach linked to or provided with the next play. Having reviewed the play, the players and coaches then perform the step 230 of physically performing the next play, as well as providing any related coaching signals associated with the play. Finally, the coach's portable electronic device performs the step 240 of transmitting the recording of the just performed play's video clip to each player's portable/wearable electronic device to provide immediate feedback about the performance of the executed play, along with optional notes about areas of improvement and additional coaching tips.

Thus, this system and process provides each player and coach to take (in effect) three repetitions for each individual play within a condensed time span: 1) a mental repetition; 2) a physical repetition; and 3) a review of feedback repetition. This process further occurs immediately on the playing field, and is believe to be a process that can be completed within two minutes per play for football, hockey, lacrosse or soccer, which is crucial for high school and college applications where practice times are limited by regulation. Further, by providing this process in an animated playbook and an associated electronic display, this system and process avoids limitations in current systems which rely upon drawings and memorization, with their attendant problems. For instance, such a system and process reduces common mistakes such as misalignment, missed responsibilities, lack of playbook knowledge, or an inability to focus upon and memorize such playbook drawings. Rather, this system and process allows coaches to focus on positions specific units, giving players the ability to conduct the replay and correct errors instantly through this feedback loop. For instance, those of skill in the art having this teaching will understand that the present invention can include multiple video recorders 114, each focused on a different group of players (e.g., a football practice wherein the first camera is focused on line play, with a second camera focused upon the secondary) thus allowing more precise, immediate, and recursive coaching, and video recorders 114 that record from the players' first-person point of view.

Figure 3:
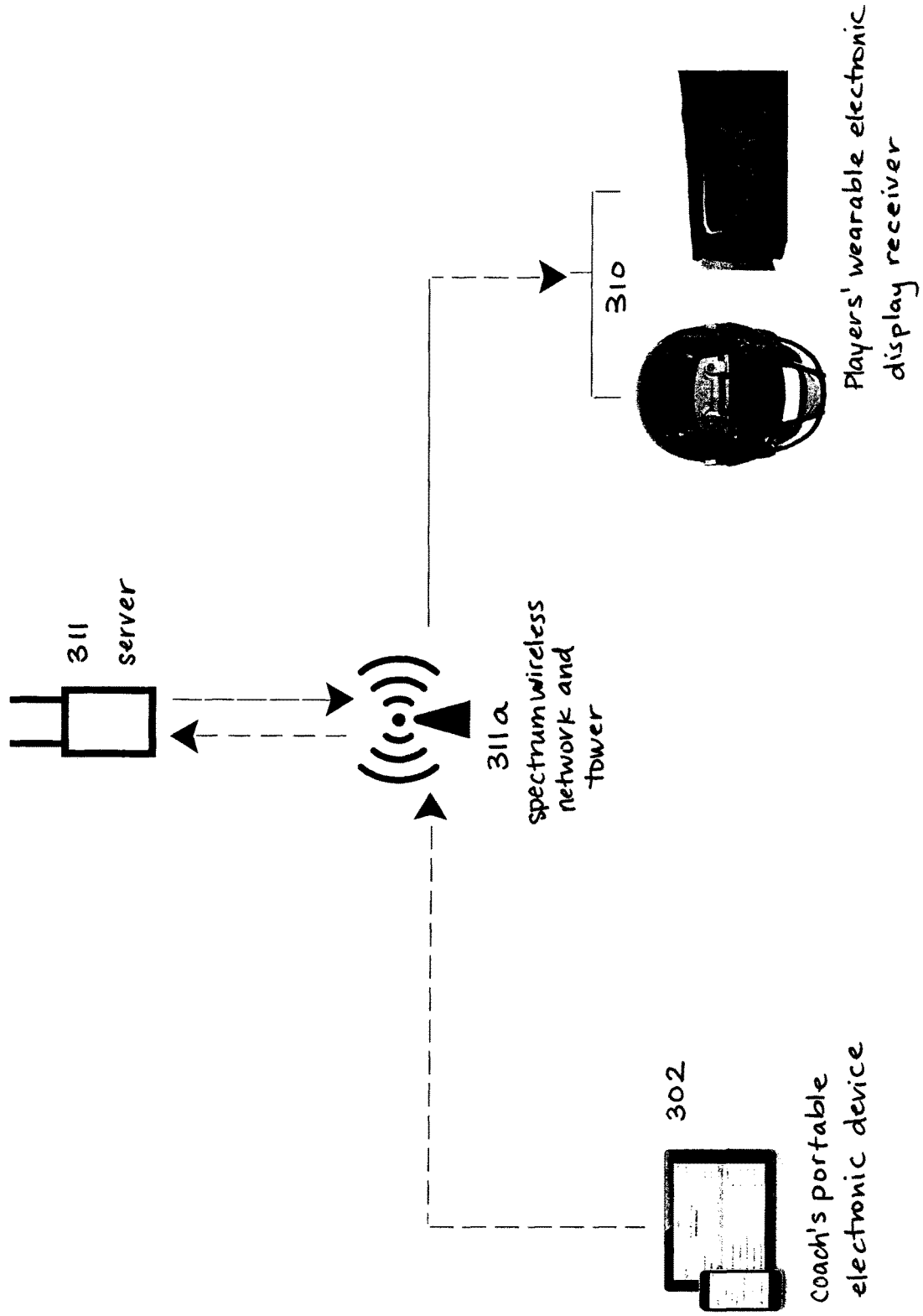
FIG. 3 is a process flow diagram of a preferred embodiment of the server communication means of the present invention.

As shown in FIG. 3, the process depicted in FIG. 1 may occur solely or in part through the use of spectrum wireless networks. A coach's portable electronic device 302 communicates an input from a coach to a remote spectrum wireless network tower 311a. In turn, the input is communicated to and from the server 311 and subsequently to a player's wearable electronic display receiver 310. Likewise, a player's voice command or input can be transmitted back to the coach's portable electronic device 302 via the spectrum network tower 311a and server 311.

Testing, research, and development by the applicant have shown the use of a Spectrum networking protocol (SN) over a local 802.11 b/g/n Wireless Networking (2.4 GHz+5 GHz) (LAN) protocol optimizes the performance and operation of the present invention in its most preferred embodiment. One problem with using LAN is the abundance of wireless networks in operation within a localized geographic area where players practice. The 2.4 GHz frequency (which is the most popular wireless frequency) has a limited number of available channels allotted for networks to utilize, thus creating network overlapping and significant channel interference. This interference creates a "choke" effect on shared-channel signals, thus degrading the performance of wireless products by delaying data transfer and causing connection issues between the LAN and the on-field player units.

Use of an LAN network in an embodiment of the present invention creates a direct, efficient connection for transmission of the player's data (through the use of a server 111 system and/or router 112) and a connection between the coach's portable electronic device 302 (for sending playbook plays) and the player's wearable electronic display receiver 310 (for receiving playbook plays). However, the rise of wireless network congestion and interference issues makes spectrum wireless networks an improved platform for communications between a coach's portable electronic device 302 and player wearable electronic display receiver 310.

A preferred embodiment of the present invention uses spectrum wireless networks. First, this embodiment is optimal because spectrum wireless networks operate on a different frequency system than that of traditional wireless networks (e.g. Wi-Fi); thus they are not subject to the same interference issues experienced though the LAN protocol. Wi-Fi operates on a 802.11 b/g/n Gigahertz (GHz) frequency that is split into two band types (2.4 GHz and 5 GHz), but a spectrum wireless network operates on the Megahertz (MHz) frequency and is split between a vast number of frequency and band channels (700 MHz-900 MHz), creating a larger network pool and operating independently of LAN Wi-Fi frequency inter-dependencies.

Second, using spectrum wireless networks allows each on-field player's wearable electronic display receiver 310 to maintain a direct one-to-one connection between the invention hardware and the cloud server, creating an uninterrupted communication stream that maximizes data transmission and receiving processes between the player wearable electronic display receivers and the coach's portable electronic device 302. LAN systems and local on-field distributed server systems capped the number of player wearable electronic display receivers 310 that could be used simultaneously at a total of 50 units before performance degraded significantly, whereas the number of devices which may be used with spectrum wireless networks is virtually unlimited. Further, if one device fails on-field, the one-to-one connection permitted by spectrum wireless networks allows the remaining units to perform normally.

Figure 4:
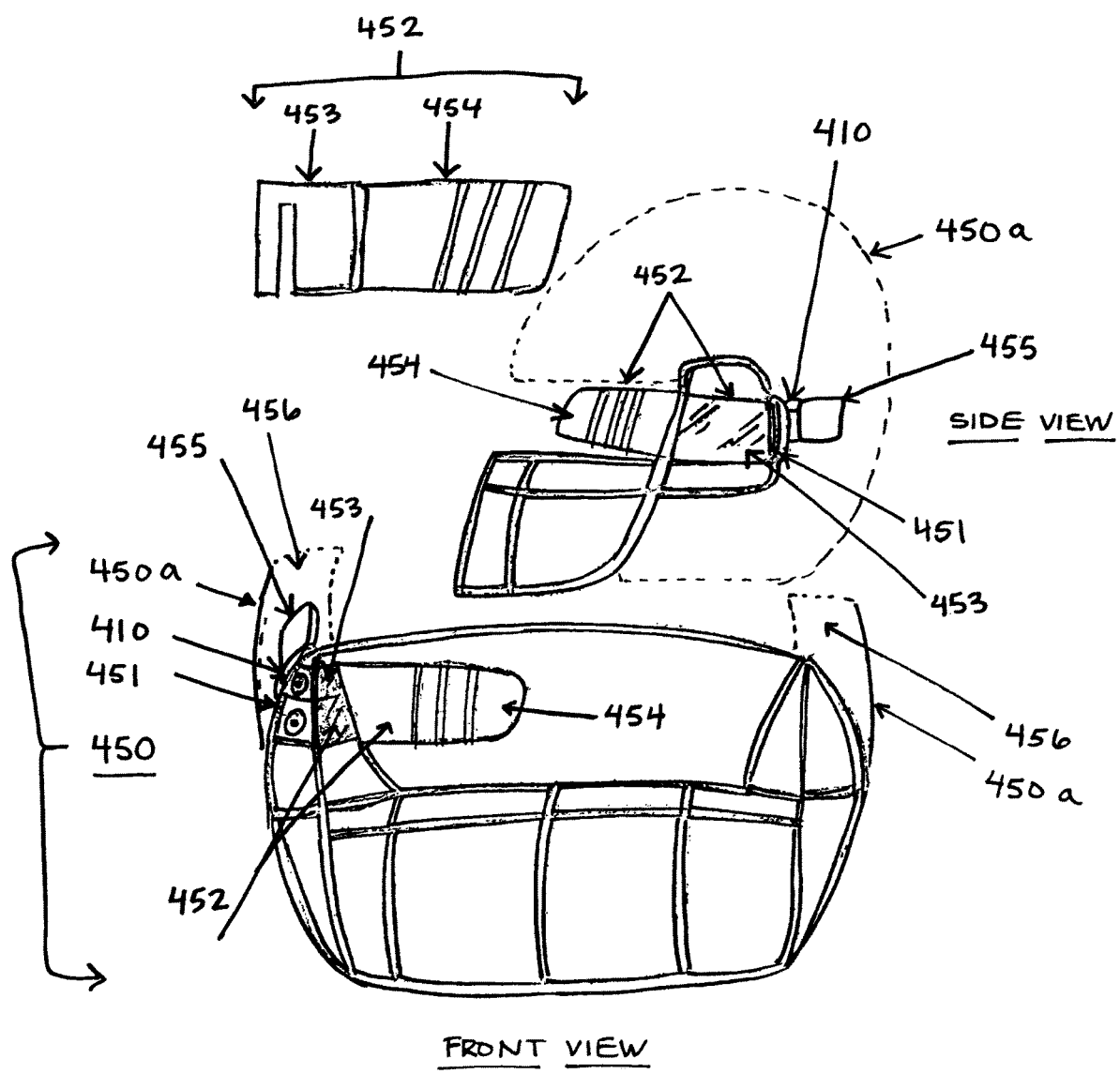
FIG. 4 is a schematic of a second preferred embodiment of the interactive, recursive and in situ coaching system of the present invention, housed in a helmet apparatus.

Further depicted in FIG. 4 is another preferred embodiment of the present invention. The player's helmet apparatus 450 is comprised of a helmet shell 450*a*, which fully encases a wearable computer device 410 mounted inside the helmet apparatus by an enclosed embedded mount 451, an adjustable optical piece 452, and a power source 455. The wearable computer device 410, the mount 451, and the optical engine portion of the optical piece 453 are fully embedded in the padding 456 inside the helmet; the optical display 454 portion of the adjustable optical piece 452 is exposed for the player to view.

While the disclosure is susceptible to various modifications and alternative forms, specific exemplary embodiments thereof have been shown by way of example in the drawings and have herein been described in detail. For instance, server communications could be executed on-field, off-site, or cloud-based, and using, for example, Wi-Fi, spectrum wireless networks, Bluetooth, or other technologies or combinations thereof. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A system for providing an interactive, recursive and in situ coaching system comprising:
    a) a coaching computer module, wherein the coaching computer module allows for at least one user to provide at least a first signal corresponding to a first play to be performed and repeated from a playbook and a second signal corresponding to a second play from the playbook to a plurality of players and coaches, said coaching computer module storing said first time stamp signal recording;
    b) a plurality of wearable computer devices, wherein each of the plurality of wearable computer devices generates an electronic display corresponding to the first play on the wearable computer device, and each of the plurality of wearable computer device accesses further information linked to the first play;
    c) a playbook generation module electronically linked to the playbook, wherein the at least one user develops at least one play through the playbook generation module that is transmitted via the coaching computer module to a plurality of players and coaches via the plurality of wearable computer devices;
    d) a practice module electronically linked to the playbook, wherein the practice module obtains information that is entered by a user from the playbook to be used during a practice period;
    e) a server for receiving and sending signals between the coaching computer module and the plurality of wearable computer devices, wherein the coaching computer module sends said first signal to said server, and said server receives said first signal and then transmits said first signal to said plurality of wearable computer devices to be accessed;
    f) a software application trigger accessible through the server that captures a first time stamp signal recording corresponding to said first signal from the coaching computer module, whereby the software application trigger selects at least one camera for recording the performance of the first play, wherein the server transmits the recording of said first play to at least the coaching computer module upon receiving a second time stamp signal corresponding to said second signal from the coaching module; and
    g) an authentication module accessible by at least one of the playbook, the practice module and the server, wherein the server processes the first signal from the coaching computer only if authentication has been granted by the server, and wherein the said server will receive and then transmit the first signal to the plurality of wearable computer devices having a compatible authentication module;
        wherein said coaching computer module links said first time stamp signal recording with at least one of said practice module, said playbook generation module, or said plurality of wearable computer devices for in situ review, said coaching computer module further transmitting to said server a signal corresponding to first time stamp signal recording to be transmitted to said plurality of wearable player devices for access.

2. The interactive, recursive and in situ coaching system of claim 1, further comprising a trigger within one of said plurality of wearable computer devices to receive said transmission of a signal corresponding to first time stamp signal recording from said server, as sent by said coaching computer module, to access said signal corresponding to first time stamp signal recording on said plurality of wearable computer devices.

3. The interactive, recursive and in situ coaching system of claim 1, wherein each of said plurality of wearable player devices further comprises a display screen which provides a display corresponding to first time stamp signal recording.

4. The interactive, recursive and in situ coaching system of claim 3, wherein each of said plurality of wearable computer devices further includes a user input to enable a player to provide a user input in response to said display corresponding to first time stamp signal recording.

5. The interactive, recursive and in situ coaching system of claim 4, wherein the plurality of user wearable computer devices accesses at least one play from said playbook.

6. The interactive, recursive and in situ coaching system of claim 4, wherein each said display screen of said plurality of wearable computer devices displays a play comprising play elements which each user of said plurality of wearable computer devices actuates to trigger additional coaching information contained within each said transmitted signal.

7. The interactive, recursive and in situ coaching system of claim 1, wherein the recording of said first play comprises a constant media stream recording which includes a time stamp, said constant media stream recording being transmitted through said server from said coaching computer module and stored within the practice module.

8. The system for providing an interactive, recursive and in situ coaching system of claim 1, wherein at least one of the plurality of wearable computer devices comprises a helmet for receiving inputs from the coaching computer module, the helmet comprising: i) a wearable computer device for receiving inputs from the coaching computer module; ii) an enclosed embedded mount for connecting the wearable computer device to the helmet; and iii) an adjustable optical piece connected to the wearable computer device for providing displays input from the coaching computer module, the adjustable optical piece being adjusted for the helmet configuration and comfort of the at least one user.

9. The device of claim 8, wherein the helmet includes a power source to provide power to the wearable computer device and adjustable optical piece, if necessary.

10. The device of claim 8, wherein communications between the coaching computer module and wearable computer device occur, at least in part, over spectrum wireless networks.

* * * * *